Nov. 3, 1964  S. FISCHER  3,154,809
APPARATUS FOR THE MANUFACTURE OF SHAPED BODIES
OUT OF THERMOPLASTIC MATERIAL
Filed Oct. 16, 1961
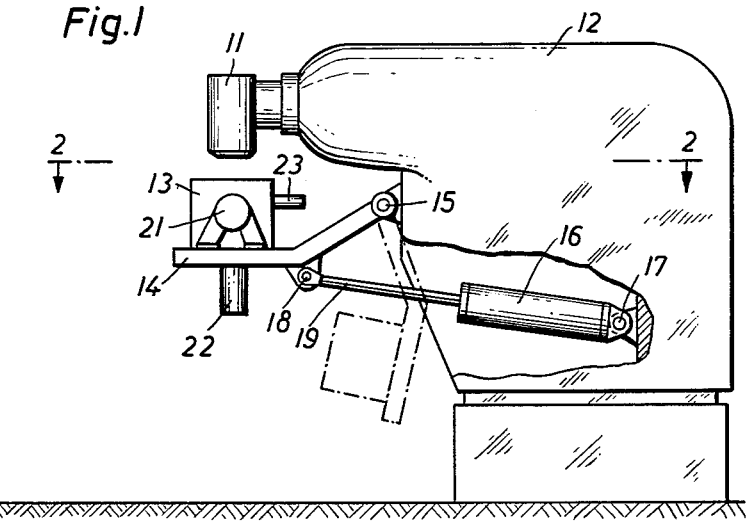
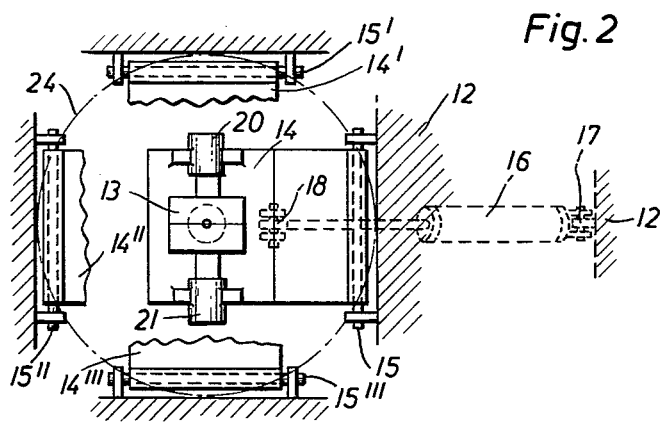
INVENTOR
STEFAN FISCHER
BY
Kleinberg & Lilling
ATTORNEYS

United States Patent Office 3,154,809
Patented Nov. 3, 1964

3,154,809
APPARATUS FOR THE MANUFACTURE OF SHAPED BODIES OUT OF THERMOPLASTIC MATERIAL
Stefan Fischer, Lohmar, near Cologne, Germany
Filed Oct. 16, 1961, Ser. No. 145,196
Claims priority, application Germany Oct. 20, 1960
6 Claims. (Cl. 18—5)

This invention relates generally to the molding of hollow objects; more particularly it presents a molding mechanism for producing hollow objects, such as bottles, or the like, from plastic or resin materials; and especially describes an apparatus for moving a molding mechanism in and out of register with a plastic or resin extruder. In the production of plastic or resin bottles, or similar hollow objects, an extruder is utilized to form a continuous tube of the material. Predetermined lengths of the tube are then severed and introduced between the halves of a mold. A medium, such as air under pressure is then introduced into the interior of the tube thereby blowing the same into the shape of the interior cavity of the mold.

It is common to grasp a portion of the extruded tube after a predetermined length of the same has been ejected in a vertically downward direction from the extruder between the halves of the mold. The mold is then moved with the severed length of the tube therewithin, away from the extruder at a velocity somewhat greater than the speed of extrusion. The severed tube can then be formed into the desired shape during the period of time that the next tube is being extruded. In order to obtain higher rates of production, two molds may be utilized to alternately sever a predetermined length of tubular material, so that even with a high rate of extrusion, one mold is always ready to grasp and sever the predetermined length of tubing. In the conventional apparatus, such molds, together with the auxiliary equipment, such as for blowing, etc., will be mounted on a table or carrier which is moved and controlled by relatively complicated and expensive hydraulic or pneumatic means. Furthermore, it will be realized that extremely accurate controlling mechanisms must be provided operating in near-perfect synchronism. Such controls, of course, contribute greatly to the high cost of the conventional apparatus.

It is a cardinal object of this invention, therefore, to provide a relatively simple and inexpensive apparatus to move one or more molds in and out of register with the head of an extruder.

It is another primary object hereof to set forth apparatus as above-described that will be both efficient and reliable.

The above is accomplished by the utilization of a swinging arrangement for one or more molds. The said swinging arrangement will move the molds into and out of register with an extrusion head as desired. When a vertical extrusion head is provided, the molds will preferably swing about a horizontal axis.

When a plurality of molds are utilized, as is common to obtain high production, the said molds, in addition to their controlling and auxiliary equipment, such as the blowing apparatus, are preferably mounted on one carrier. This said carrier may, for example, take the form of a table or the like, which will be arranged to pivot or swivel in timed relation with the working cycle of the machine. Thus, to control the movement of such a carrier, it will only be necessary to provide one hydraulic or pneumatic control cylinder. Furthermore, in that the direction of movement of the carrier is controlled primarily by its swivel bearing the control cylinder will not necessarily have to be extremely accurate as to its direction of movement.

Additionally, this construction and arrangement of parts considerably increases the capacity of the machine or apparatus as compared with the conventional machines.

As hereinabove mentioned, two molds have been utilized to increase the output of such machinery. The control of the movement of the molds are subject to very exacting requirements as regards accuracy and reliability. However, only a limited number of finished products can be produced in any given period of time. This is so in that to a great extent the production rate is limited by the period of time necessary for the blowing of the severed tube and the cooling thereof before it can be ejected from the mold, so as to make the mold available for receiving and severing the next predetermined length of tubing. This limiting factor can be avoided by a further embodiment of the instant invention and apparatus wherein any number of molds are positioned on the carrier so that they can be alternately pivoted in and out of register with the extrusion head. The time necessary for the blowing and cooling of the finished product will then determine the exact number of molds necessary to obtain a predetermined rate of production. The pivot axis of the molds and their carrier devices can be arranged in a circle about the axis of the vertical extrusion head. The radius of the circle may be determined by the number of molds to be accommodated and their dimensions.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is a side elevational view of the instant invention with a portion broken away and illustrating but one set of molds, a carrier, and operating mechanism therefor, all other molds removed.

FIG. 2 is a view taken substantially along line 2—2 of FIG. 1 illustrating an embodiment of the device wherein four sets of molds may be utilized.

Referring particularly to FIG. 1 of the drawings, there is illustrated generally at 12, an extruder which may be of the screw type and an extrusion head 11.

It will be noted that the details of the construction and operation of the extruder 12 and the extrusion head 11 are not shown or described in detail in that they are of standard construction and form no part of the instant invention. Sufficient to say, however, that the extruder head 11 is constructed and arranged to continuously eject a tube of heated plastic or resin material in workable form.

Immediately below the extrusion head 11 will be positioned the halves of a mold 13 which will be mounted on a carrier or table 14. Further, located on the said table 14 will be the mold halve opening and closing cylinders 20 and 21, the blowing mechanism 22 and the ejection equipment 23.

The carrier or table 14 will be pivotally mounted to any convenient rigid surface, such as the base of the extruder 12 by means of an axle 15. The piston rod 19 of a cylinder 16 will be pivotally connected at one end to the base of the table 14 by a hinge 18. The opposite end of the said cylinder 16 will be connected by means of a second hinge 17 to a rigid portion of the machine frame such as the base of the extruder 12.

Thus, the operation of this embodiment of the instant invention will now be apparent.

When a predetermined length of tubular material in workable form has been ejected vertically downward from the extruder head 11, the mold 13 is swung upwards to the position shown in solid in FIG. 1 by means of extending the piston rod 19 from the cylinder 16. It will be apparent that this will move the mold halves into direct register with the extruded tube so that the tubular material will be between the two halves of the mold. The mold halves will then be closed as by the cylinders 20 and 21 arranged on the table 14. This will, in turn, sever a predetermined length of the extruded tube from the remainder of the tube being ejected from the extrusion head 11.

Immediately thereafter, the piston 19 is retracted within the cylinder 16 thereby moving the table 14, together with the mold 13 away from the extrusion head 11 and into the position shown in phantom in FIG. 1. This will provide clearance for the continued extrusion of the tubular material in workable form from the extrusion head 11.

During the time that the table 14 is being pivoted to the phantom position in FIG. 1, the blowing or molding of the tube into the shape of the internal cavity of the mold can be commenced. The blown object will remain in the mold in its retracted position until it is sufficiently cooled. The mold halves will then be opened by means of cylinders 20 and 21 and the finished formed hollow object, such as a bottle or the like, will be ejected. This mold 13 will then be ready to move back into register with the extrusion head 11 repeating the cycle hereinabove set forth. However, as partially shown in FIG. 2, a plurality of tables 14, 14', 14'' and 14''' may be provided. The control and operation of the pivoting movements of the said tables may be effected by controlling elements corresponding to that illustrated in FIG. 1.

The pivot axles 15, 15', 15'' and 15''' of the said tables are arranged in a circle about the vertical axis of the extrusion head 11.

It will, of course, be realized that this permits the full utilization of the capacity of the output of the extruder 12 by permitting the utilization of a number of molds. Preferably, in order to minimize any overlapping of the swing paths of the tables, a control cycle will be selected which will operate the tables in a sequence whereby molds as far apart as possible from each other will be utilized in succession.

Furthermore, it will be apparent that any number of such molds may be utilized as desired to obtain maximum efficiency of operation.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein, or required by the prior art.

Having thus described my invention, and illustrated its use, what I claim as new and desire to secure by Letters Patent is:

1. An apparatus for forming hollow objects comprising:
   (a) means for extruding tubular material in workable form periodically downward,
   (b) a plurality of mold means adapted to be positioned to receive said tubular material periodically,
   (c) each of said mold means being mounted on a table,
   (d) cylinders on each of said tables to open and close each of said mold means,
   (e) hinge means at one end of each of said tables whereby each of said tables may be pivoted about a horizontal axis,
   (f) and activating means whereby each said table and each said mold means may be pivoted to said first position to receive said tubular material and to a second position away from said first position,
   (g) each of said mold means and each of said tables being equi-spaced about the said means for extruding said tubular material.

2. An apparatus for forming hollow objects comprising:
   (a) means for extruding tubular material in workable form periodically downward,
   (b) four mold means adapted to be positioned to receive said tubular material periodically,
   (c) each of said mold means being mounted on a table,
   (d) cylinders on each of said tables to open and close each of said mold means,
   (e) hinge means at one end of each of said tables whereby each of said tables may be pivoted about a horizontal axis,
   (f) an activating means whereby each said table and each said mold means may be pivoted to said first position to receive said tubular material and to a second position away from said first position,
   (g) each of said mold means and each of said tables being equi-spaced about the said means for extruding said tubular material.

3. An apparatus for forming hollow objects comprising:
   (a) means for extruding tubular material in workable form downward,
   (b) four mold means adapted to be positioned to receive said tubular material periodically,
   (c) each of said mold means being mounted on a table,
   (d) cylinders on each of said tables to open and close each of said mold means,
   (e) hinge means at one end of said table whereby said table may be pivoted about a horizontal axis from a first position adjacent said means for extruding tubular material to a second position removed from said means for extruding tubular material whereby when said table is in said second position said means for extruding tubular material will be able to non-interferably continue extrusion of tubular material in workable form,
   (f) and activating means whereby said table and said mold means may be pivoted between said first position and said second position.

4. An apparatus for the production of hollow objects comprising:
   (a) a head for continuously extruding heated material in workable form,
   (b) a plurality of tables each having a mold thereon,
   (c) said tables being pivotally mounted to swing about a horizontal axis to one side of said head,
   (d) and cylinder means to move said tables into a first position in register with said head and to a second position away from said head whereby said head may continue extrusion,
   (e) each of said horizontal axes are placed an equal distance apart from said extrusion head.

5. An apparatus for forming hollow objects comprising:
   (a) means for extruding tubular material in workable form downward,
   (b) four mold means adapted to be positioned to receive said tubular material, each of said mold means being mounted on a table,
   (c) cylinders on each of said tables to open and close each of said mold means,
   (d) hinge means at one end of each of said tables whereby each of said tables may be separately pivoted about a horizontal axis from a first position adjacent said means for extruding tubular material to a second position removed from said means for extruding tubular material, whereby when each of said tables is in said second position said means for extruding tubular material will be able to non-interferably continue extrusion of tubular material in workable form, (e) and activating means whereby each of said tables and said mold means thereon may be pivoted between said first position and said second position, (f) and each of said horizontal axes being equi-spaced about said means for extruding said tubular material.

6. An apparatus for the production of hollow objects comprising:

(a) a head for continuously extruding heated material in workable form, (b) four mold means each adapted to be positioned to receive said tubular material periodically, (c) hinge means in conjunction with each of said mold means whereby each of said mold means may be separately pivoted about a horizontal axis, (d) each of said horizontal axes being equi-spaced about said means for extruding tubular material, (e) and activating means whereby each of said mold means may be pivoted to a first position to receive said tubular material and to a second position away from said first position independently of said other mold means.

References Cited in the file of this patent

UNITED STATES PATENTS

| | | |
|---|---|---|
| 1,500,879 | Miller | July 8, 1924 |
| 2,249,709 | Hoge | July 15, 1941 |
| 2,903,740 | Parfrey | Sept. 15, 1959 |
| 2,952,034 | Fortner | Sept. 13, 1960 |
| 2,975,473 | Hagen et al. | Mar. 21, 1961 |